United States Patent [19]

Hilfiker

[11] 3,834,566

[45] Sept. 10, 1974

[54] PIPE HANDLING ATTACHMENT FOR A BACKHOE

[75] Inventor: William K. Hilfiker, Eureka, Calif.

[73] Assignee: Hilfiker Pipe Co., Eureka, Calif.

[22] Filed: Jan. 18, 1973

[21] Appl. No.: 324,575

[52] U.S. Cl. ........ 215/138 R, 214/145, 214/DIG. 3, 214/130 C

[51] Int. Cl. ........ B66f 9/00

[58] Field of Search .......... 214/138, DIG. 3, DIG. 4, 214/DIG. 5, 131 A, 145, 130 B, 620, 130 C

[56] References Cited

UNITED STATES PATENTS

| | | | |
|---|---|---|---|
| 2,966,180 | 12/1960 | Bles | 214/138 R |
| 3,061,123 | 10/1962 | Rogers | 214/145 |
| 3,352,433 | 11/1967 | Moore | 214/145 |
| 3,403,940 | 10/1968 | Clark | 214/145 |
| 3,595,411 | 7/1971 | Ables | 214/145 |
| 3,705,658 | 12/1972 | Harris | 214/DIG. 3 |

*Primary Examiner*—Robert J. Spar
*Assistant Examiner*—John Mannix
*Attorney, Agent, or Firm*—Naylor, Neal & Uilkema

[57] ABSTRACT

A conventional hydraulically actuated backhoe excavator adapted to handle heavy and cumbersome pipe sections by a shaft attached to and extending from the rear of the bucket such that it rotates with the bucket in the plane of the boom and stick without significantly impairing the excavating capabilities of the backhoe.

10 Claims, 4 Drawing Figures

PIPE HANDLING ATTACHMENT FOR A BACKHOE

BACKGROUND OF THE INVENTION

The invention relates to a pipe handling attachment for a conventionally powered backhoe excavator which does not impair the excavating functions thereof.

Hydraulically actuated backhoe excavators are typically used to open a trench for laying underground pipeline. Because of the weight and size of pipe sections, a separate pipe handling crane and a crew of men are usually required for placing the pipe sections and joining them together in the trench. Specifically, the pipe sections are lifted and lowered into the trench by looping a cable or chain around the exterior of the pipe section and securing the ends of the cable to a hook at the end of a winch cable of the pipe handling crane. A pipe handling crane usually comprises a boom pivotably secured to a movable platform with a pulley on its distal end for carrying a winch cable, and a cable winch mounted on the platform. The crane lifts the pipe section and lowers it into the open trench. The pipe section is then manually positioned in the trench and secured to previously laid pipe sections, whereupon the cable loop is manually unfastened.

Often the backhoe itself is pressed into service as a pipe crane after it opens the trench. In such instances, a cable is extended around the exterior of the pipe sections and the ends thereof are secured together to form a loop. Alternatively, the ends of a length of cable are secured to the opposite ends of the pipe section to form a loop. In either case, the resulting cable loop is looped around the backhoe bucket or hooked onto a hook mounted on the backside of the bucket. The pipe section is then lifted by the backhoe and lowered into the trench, then manually positioned in the trench and secured to the previously laid pipe sections, whereupon again the pipe section is manually unhooked from the cable.

Either of the methods described above for laying pipe requires manually positioning of the pipe sections in the trench which is tedious, time-consuming, hard labor. Typically, a crew of four to six men, including the crane and backhoe operators, are required to lay an underground pipeline. Such is wasteful of manpower and is dangerous to life in that such trenches are prone to collapse. In fact, job safety regulations require excavated trenches, below a certain depth, to be shored up to prevent collapse if men are to be working in the trench. Such shoring up requires additional man hours and greatly complicates the task of lowering the pipe section into, and then positioning it in, the trench for connection to previously laid pipe sections.

Finally, conventional cable type handling techniques are inherently unsafe. Specifically, such cable pipe handling apparatuses require an additional man to hook the cable to the pipe section, steady it as it is raised, and to position it carefully as it is lowered. Such a person is always exposed to the danger of being severely injured by the hanging pipe section either because of cable breakage or because of an inadvertent handling mistake by the crane operator.

SUMMARY OF THE INVENTION

In accordance with the present invention, a conventionally powered backhoe excavator is adapted to handle pipe sections by securing one end of a longitudinal shaft to the actuator connection on the rear lever arm structure of the backhoe bucket such that the shaft will pivot with the bucket structure in the plane of the boom and stick without significantly impairing the excavating capabilities of the backhoe.

Specifically, the inventive pipe handling attachment allows an operator of a backhoe to open a trench and, then, by appropriate manipulation of the backhoe controls, to insert the attached longitudinal shaft extending from the rear of the bucket into the interior of the pipe section, deftly lift it up, lower it into the trench, position it therein, and push it into a connecting relationship with previously laid pipe sections without the aid of a manual labor crew.

An additional object of the inventive pipe handling attachment is to give a conventional hydraulically actuated backhoe the capability of handling heavy and cumbersome pipe sections without the aid of a manual labor crew, an entirely new, functional capability. In particular, the inventive attachment eliminates the cumbersome cable loop priorly required for handling pipe sections. The invention also circumvents the necessity of shoring up trenches in pipe laying operations by eliminating the need for manual handling of the pipe sections in the trench.

Still another object and advantage of the invention is a novel method or technique for laying an underground pipeline with a backhoe.

Yet another object is to provide an attachment which facilitates a backhoe for use as a crane.

In summary, the purpose of the inventive pipe handling attachment for a backhoe is to convert the backhoe into a more efficient and versatile apparatus for handling pipe sections than has previously existed.

The foregoing and other objects, advantages, and characteristics of the inventive pipe handling attachment for a backhoe will become more clearly apparent in the following detailed description of an illustrative embodiment of the inventive attachment.

DETAILED DESCRIPTION OF THE ILLUSTRATED EMBODIMENT

Figure 1:
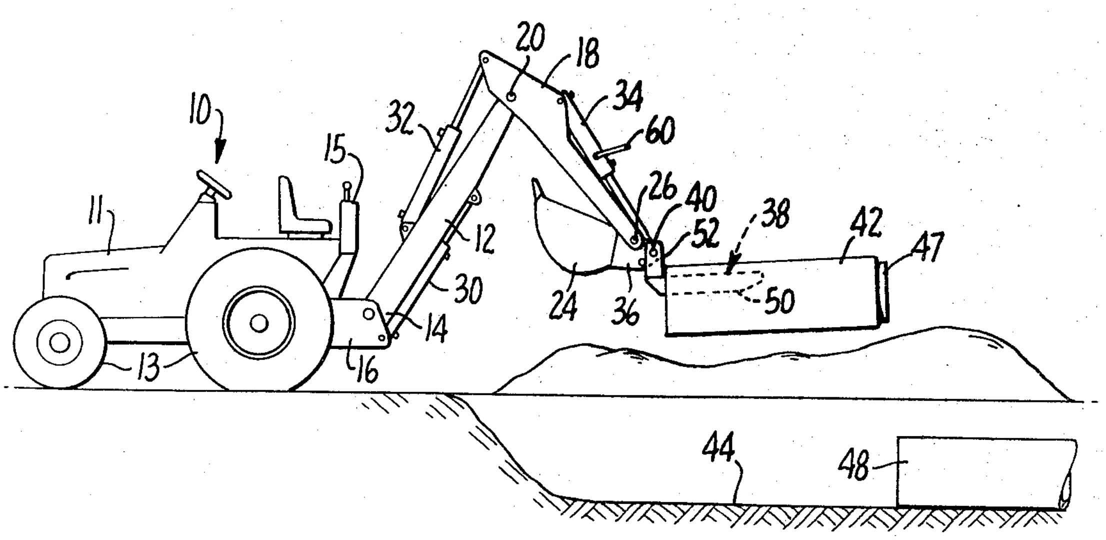
FIG. 1 is a side elevational view of a conventional hydraulically actuated backhoe with an embodiment of the inventive pipe handling attachment showing the backhoe lowering a pipe section into a just previously excavated trench.

With reference to FIG. 1, a conventional hydraulically actuated backhoe generally designated 10 includes a boom structure 12 pivotably connected at its base 14 to a mobile tractor platform 16; a stick or lever 18 pivotably connected at a fulcrum point 20 to the top end of the boom 12, and a bucket structure 24 pivotably connected at a fulcrum point 26 to the distal end of the stick 18. An hydraulic actuator 30 for the boom 12 is connected between the platform 16 and the midportion of the boom for hydraulically pivoting the boom 12 relative to the platform 16. An hydraulic actuator 32 for the stick 18 is connected between the boom 12 and the top end of the stick 18 for pivoting the stick about the fulcrum connection 20. An hydraulic actuator 34 for the bucket 24 is connected between the stick 18 and the rear lever arm structure 36 of the bucket 24 for pivoting the bucket about its fulcrum connection 26 with the stick. The inventive pipe handling attachment 38 is secured to the rear lever arm structure 36 of the bucket 24 by the same bolt or pin 40 which connects the bucket actuator 34 to the bucket structure 24. As shown in FIG. 1, a pipe section 42 disposed on the pipe handling attachment 38 is in the process of being lowered into a just excavated trench 44. The pipe section 42 includes a shoulder 47 of lesser outside diameter than the pipe section 42 which is adapted to be received in an annular recess (not known) of a previously laid pipe section 48.

Still referring to FIG. 1, the power for driving the hydraulic actuators 30, 32 and 34 is provided by the tractor engine 11 which drives an appropriate hydraulic fluid pump (not shown). The engine 11 is also operably connected by connectional means to the tractor wheels 13. Finally, the backhoe is manipulated by a conventional combination of manually operable valves 15 connected between the pump and hydraulic actuators 30, 32 and 33 by appropriate pressurized fluid conduits (not shown for purposes of clarity).

Figures 2, 3, 4:
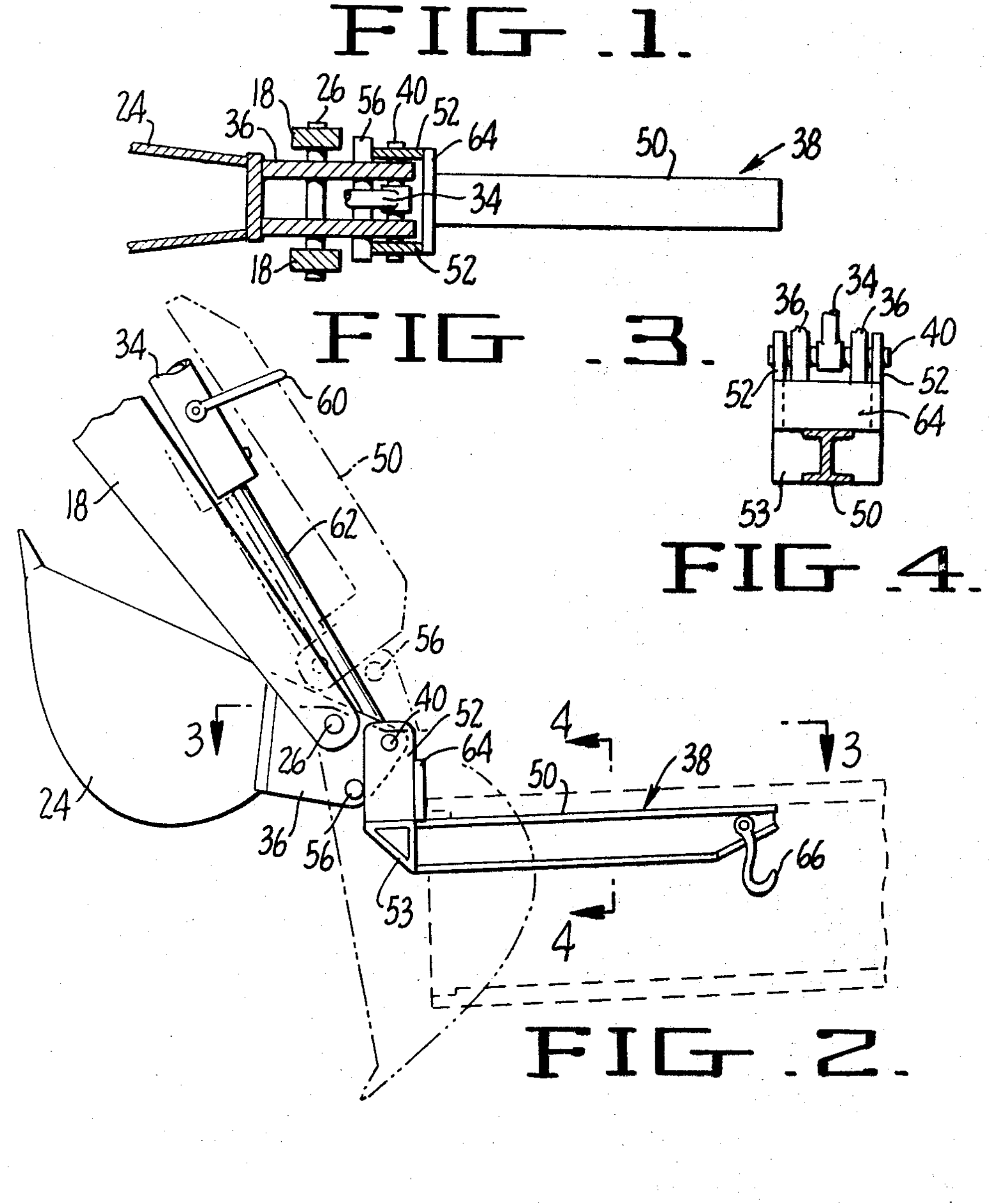
FIG. 2 is a close side view of an embodiment of the inventive pipe handling attachment showing its relationship with the bucket and stick of the backhoe.
FIG. 3 is a plan sectional view of the inventive pipe handling attachment taken along the plane designated by line 3—3 of FIG. 2.
FIG. 4 is a sectional view of the pipe handling attachment taken along the plane designated by line 4—4 of FIG. 2.

With reference to FIGS. 2, 3 and 4, the inventive pipe handling attachment is basically a longitudinal shaft 50 formed of, for example, an I-beam of high strength steel and two connecting flanges 52 extending perpendicularly upward in spaced-apart, parallel relationship from the longitudinal shaft 50. The flanges 52 are welded to a triangular brace 53 from which the shaft 50 perpendicularly extends. The connecting flanges 52 include holes for receiving the bolt or pin 40 connecting the bucket actuator 34 to the rear lever arm structure 36 of the bucket 24. As shown in FIGS. 2 and 3, the back edges of the connecting flanges 52 rest against a stop 56.

More particularly, with reference to FIG. 3, the stop is essentially a pin or similar item connected through the rear lever arm structure 36 of the bucket 24. The stop 56 prevents the pipe handling attachment 38 from pivotably rotating clockwise with reference to FIG. 2 on the bolt 40 past a certain point. Thus, once the connecting flanges 52 are resting against the stop 56, the pipe handling shaft becomes a rearward extension of the rear lever arm structure 36 of the bucket 24 and will integrally pivot with the bucket 24 about the fulcrum connection 26 between the bucket 24 and the stick 18.

Additionally, the pipe handling attachment 38 can be swung upward about the pin 40 relative to the structure 36 (turned counter-clockwise per FIG. 2) to an inoperative position, as shown in phantom in FIG. 2. A bail 60 connects to the pipe handling shaft 38 to hold it in the inoperative position. The bail 60 is connected to the outer housing of the bucket hydraulic actuator 34 and engages the longitudinal shaft 50, such that the attachment 38 can move freely with the push-pull rod 62 of the bucket actuator.

If the bucket is used for excavating while the attachment 38 is in the inoperative position, the connecting flanges 52 pivot on the bolt 40 as the bucket 24 pivots on its fulcrum connection 26 with the stick 18. The stop 56 is so located on the rear lever arm structure 36 of the bucket 24 that it does not abut against the backside of the connecting flanges 52 when the bucket 24 is in a fully extended position (shown by the phantom lines in FIG. 2). Accordingly, as illustrated, the pipe handling shaft attachment 38 does not interfere with the excavating capabilities of the backhoe 10.

However, in some backhoe models, it may not be possible to position a stop on the rear lever arm of the bucket without unduly restricting the rotation of the bucket about its fulcrum connection with the stick. In such cases, the stop may be removed to eliminate the interference when the pipe handling shaft is swung upward to the inoperative position.

With reference to FIG. 2, when the pipe handling attachment 38 is in an operative position, the longitudinal shaft 50 extends in generally horizontal plane, and the bucket 24 is in a tucked position, i.e., rotated clockwise relative to FIG. 2 as far as it can go. As shown in FIG. 2, the bucket actuator 34 can only tilt the shaft 50 upwardly from the position shown in solid lines. The boom actuator 30 and/or stick actuator 32 is used to tilt the longitudinal shaft 50 below the horizontal plane. The purpose of having the bucket in a "tucked" position is to prevent it from significantly interfering with positioning or placing pipe sections with the attachment 38.

Referring now to FIGS. 2 and 3, the pipe handling shaft 38 includes an abutment plate 64 disposed between and braced by the connecting flanges 52, and hook 66 connected by an appropriate bolt to the end of the shaft 50. The hook enables the invention to be used as a lifting crane. It is also anticipated that a winch might be mounted on the shaft with a cable paid out therefrom over a sheave at the end of the shaft. Such a winch also facilitates the attachment for use as a lifting crane.

As is known by those familiar with backhoe excavators, the rear lever or moment arm structure to which the bucket hydraulic actuator is connected for pivoting the bucket about its fulcrum connection with the stick varies considerably between different brands and models of backhoes. Accordingly, as is realized by those skilled in the art, the particular means by which a longitudinal shaft is connected or attached to the rear moment arm structure of the excavator bucket of a backhoe will also vary between backhoe models and brands. The preferred design criterial for a pipe handling shaft attachment for use in combination with the excavator bucket of a backhoe is as follows:

a. The longitudinal shaft of the attachment should extend in the same plane as does the boom and stick of the backhoe.

b. The attachment should be connected to the rear moment arm structure of the bucket such that the bucket actuator rotates the extending shaft upward, i.e., such that when the attachment is in the operative position extending in a generally horizontal plane, the bucket is in a "tucked" position.

c. The extending shaft should be mounted on the rear moment arm structure of the bucket such that either it can be pivoted into a position where it does not interfere with the excavating function of the bucket or mounted rigidly on the rear moment arm structure of the bucket in such a fashion that it will not significantly interfere with the excavation capability of the backhoe.

It should also be appreciated by those skilled in the art that the described pipe handling shaft attachment can be adapted to be pivotally connected to the end of the stick element in place of the excavation bucket. In addition, it is possible to connect the inventive pipe handling shaft to the stick above the bucket and achieve the same functional capabilities as are described above.

Now referrring ack to FIG. 1, the described pipe handling shaft attachment for a backhoe allows an operator of a backhoe to lay an underground pipeline alone. Specifically, the operator can excavate a trench 44 of sufficient length to receive a single pipe section 42 with the bucket 24. During the excavating, the pipe handling attachment 38 can either be in the operative position or swung up into the inoperative position (see FIG. 2). Then, with the backhoe positioned at the end of the opened trench, the operator inserts the longitudinal shaft 50 of the attachment 38 longitudinally into the interior of a pipe section 42 previously placed on the ground nearby, then deftly lifts the pipe section 42 by tilting the extending shaft 50 slightly above the horizontal and holding it in that relationship as he lifts the pipe section 42 by means of the boom actuator 30 and/or stick actuator 32. The operator then can lower the pipe section into the trench by similar control over the boom and stick hydraulic actuators, position it in alignment with the previously laid pipe sections 48 and then, by appropriate manipulation of the hydraulic actuators 30 and 32 and/or the tractor platform, push the pipe section 42 into a connecting relationship with the previously laid pipe section 48. Then, again, using the backhoe bucket, the operator can scrape the previously excavated dirt back over the just laid pipe section, leaving the unconnected end clear to receive the next pipe section. From the above, it is obvious that it is no longer necessary to have a man in the trench to position or handle the pipe sections.

Referring now to FIG. 2, the length of the longitudinal shaft 50 extending from the rear moment arm structure of the bucket 24 is an important factor in the ability of the backhoe to handle pipe sections. Specifically, if the shaft is too short, the pipe sections are likely to tip off of the inserted shaft. To prevent the pipe sections from tipping off the shaft, it should reach approximately to the mid-point of the pipe section when inserted therein. Accordingly, since pipe sections come in many different lengths, it is desirable to have an extension for the pipe handling shaft. Such an extension could comprise, for example, a simple rectangular bar which could be bolted to the extending longitudinal shaft 50. More specifically, with reference to FIG. 4, if the longitudinal shaft 50 is a conventional I-beam, the end of the I-beam could form a tongue element which could be inserted into an integral receiving clamp of the extension bar. By appropriately dimensioning the extending clamp portions of the bar to fit within the extending top and bottom shoulders of the I-beam, a very rigid extension can be formed.

From the foregoing, it can be seen that the inventive pipe handling shaft attachment for a backhoe fully accomplishes its intended objects. In addition, the inventive attachment is simple, rugged, durable and can be readily secured to the excavator bucket of almost any backhoe without significantly interfering with the excavating capabilities of that backhoe. Finally, the inventive pipe handling shaft for backhoes can be formed of any structural steel stock, pipe or other strong rigid structural material.

While the inventive pipe handling attachment is described with respect to a relatively simple embodiment, it will be apparent to those skilled in the art that numerous variations and modifications may be made within the spirit and scope of the invention as set forth in the appended claims.

I claim:

1. In a backhoe excavator including an hydraulically powered and controlled boom, stick and bucket, said bucket having a rear lever arm structure to which an hydraulic actuator for the bucket is connected, the improvement comprising, in combination therewith, a longitudinal shaft adapted for insertion in pipe sections, said shaft being secured to the rear lever arm structure of the bucket for pivotal movement relative thereto between an operable position extending rearwardly from the backhoe for movement with the lever arm structure to provide a rearward extension of the structure and an inoperable position swung upwardly relative to the lever arm structure wherein the shaft is free to pivot relative to the structure so as to avoid interfering with pivotal movement of the bucket relative to the stick and means for selectively securing the shaft in the inoperative position, said shaft, when in the operative position, adapting the backhoe for movement of a pipe section from a first position to a second position by inserting said rearward extension longitudinally into the interior of said pipe section and then lifting and moving said pipe section disposed on the shaft from a first position to a second position by appropriate hydraulic manipulation of said boom, stick and bucket.

2. In a backhoe excavator according to claim 1 the improvement being further characterized in that a single pin connects the shaft and the hydraulic actuator for the bucket to the rear lever arm structure.

3. In a backhoe excavator according to claim 2, the improvement further comprising means for preventing the shaft from pivoting downward on said pin below the operable position.

4. In a backhoe excavator according to claim 3, the improvement being further characterized in that the means for preventing said shaft from pivoting downward below the operable position comprises in combination a structural stop integral with the rear lever arm structure and a cooperative receiving element integral with the shaft and adapted for engaging said stop, said stop being located below said pin connection between the shaft and rear lever arm structure whereby said receiving element assumes abutting engagement with said stop when the shaft is in the operable position.

5. In a backhoe excavator accordin to claim 4, the improvement being further characterized in that the stop can be removed from the rear lever arm structure when the shaft is pivoted upward to the inoperable position.

6. In a backhoe excavator according to claim 4, the improvement being further characterized in that said stop is positioned on the rear lever arm structure of the bucket such that it avoids engaging the receiving structure of the shaft when the shaft is pivoted into the inoperable position to thereby allow the bucket to pivot freely about a fulcrum connection connecting the bucket with the stick of the backhoe.

7. In a backhoe excavator according to claim 1, the improvement further characterized in that the shaft comprises an abutment plate proximate the end thereof secured to the lever arm structure, said abutment plate being generally perpendicular to and extending upward from the shaft, whereby said plate engages the end of a pipe section when said shaft is inserted therein to thereby allow the backhoe to push said pipe section.

8. In a backhoe excavator according to claim 1, the improvement further characterized in that the shaft has a linear dimension greater than one-half the longitudinal dimension of said pipe sections.

9. In a backhoe excavator including an hydraulically powered and controlled boom, stick and bucket assembly, the improvement comprising a shaft secured to and extending from said assembly for pivotal movement relative thereto between an operable position extending rearwardly of the backhoe for movement with the bucket to provide a rearward extension thereof and an inoperable position swung upwardly relative to the bucket wherein the shaft is free to pivot relative to the bucket so as to avoid interfering with pivotal movement of the bucket relative to the stick and means for selectively securing the shaft in the inoperative position.

10. In a backhoe excavator according to claim 9 further comprising attachment means on the shaft for securing a cable thereto to facilitate the shaft for use as a lifting crane.

* * * * *